United States Patent
Tamai

(10) Patent No.: US 7,813,290 B2
(45) Date of Patent: Oct. 12, 2010

(54) PROGRAM, METHOD AND APPARATUS FOR COLLECTING INFORMATION

(75) Inventor: Hiroaki Tamai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 12/125,119

(22) Filed: May 22, 2008

(65) Prior Publication Data

US 2008/0291836 A1    Nov. 27, 2008

(30) Foreign Application Priority Data

May 25, 2007   (JP)   ............... 2007-139663

(51) Int. Cl.
G01R 31/08   (2006.01)
H04L 12/28   (2006.01)
(52) U.S. Cl. ...................... 370/241; 370/389
(58) Field of Classification Search ............ None
See application file for complete search history.

(56) References Cited

U.S. PATENT DOCUMENTS

2002/0049913 A1*   4/2002   Lumme et al. ............. 713/201
2002/0150114 A1*  10/2002   Sainomoto et al. ......... 370/402
2006/0045067 A1*   3/2006   Dezonno et al. ............ 370/352
2006/0288096 A1*  12/2006   Yim ........................ 709/224

FOREIGN PATENT DOCUMENTS

JP    10-023011    1/1998
JP    2005-341361  12/2005

* cited by examiner

Primary Examiner—Kevin C Harper
Assistant Examiner—Christine Duong
(74) Attorney, Agent, or Firm—Staas & Halsey LLP

(57) ABSTRACT

An information collecting apparatus judges whether the received packet corresponds to a monitoring target, adds identifying information to the judged monitoring target packet, adds process information indicating a user policy used in processing of the monitoring target packet at each function processing units to the monitoring target packet, and stores each process information added to the monitoring target packet, in association with the identifying information added to the monitoring target packet.

9 Claims, 9 Drawing Sheets

FIG. 3

| PACKET JUDGING TABLE | |
|---|---|
| TARGET PACKET INFORMATION (DESTINATION ADDRESS/ DESTINATION PORT NUMBER/ APPLICATION USER IDENTIFICATION NUMBER) | PACKET IDENTIFICATION ID |
| ....../...... | ...... |
| ... | ... |

FIG. 5

| PACKET IDENTIFICATION ID | DEVICE INSIDE INFORMATION | |
|---|---|---|
| | PROCESS INFORMATION IN EACH FUNCTION PROCESSING BLOCK UNIT | |
| ... | ... | ... | he# PROGRAM, METHOD AND APPARATUS FOR COLLECTING INFORMATION

CROSS-REFERENCE TO RELATED APPLICATIONS

This application is related to and claims priority to Japanese patent application no. 2007-139663 filed on May 25, 2007 in the Japan Patent Office, and incorporated by reference herein.

BACKGROUND

1. Field

The embodiments of the present invention relate to an information collecting program stored on a computer readable recording medium, an information collecting method and an information collecting apparatus. The program, the method and the apparatus can be applied to a network apparatus that includes a plurality of function processing units, for example.

2. Description of the Related Art

Technology for collecting fault information from each of communication devices, which are included in a communication network system, to detect a fault occurred in each communication device has been known. Japanese Patent Application Laid-Open Publication No. 10-23011, for example, describes an example of such fault information collecting technology.

An integrated network device integrates a plurality of sorts of function processing on packets sent by users that are passing through a network. There has been technology of collecting process information for determining the cause of packet discard for each function processing unit, in such a case where a packet is unexpectedly discarded in the integrated network device. The integrated network device determines the cause of unexpected discard of a packet concerned based on a user policy and information indicating a process, to be called "process information" thereafter, when the packet concerned is unexpectedly discarded. The user policy setting a association among sub functions of each function processing unit for passing through the network for each user, and the process information is collected for each function processing unit.

However, the above-mentioned technology cannot promptly determine the cause of unexpected discard of a packet.

The conventional technology collects process information, however it cannot promptly recognize which function processing unit the unexpectedly discarded packet concerned passed through by using which sub function. Therefore, it might be difficult to promptly determine the cause as the conventional technology cannot immediately recognize whether the user policy for the packet concerned is in right association with each sub function of each function processing unit through which the packet has passed or not.

SUMMARY

In one aspect of an embodiment of the invention, information collecting apparatus may promptly determine the cause of unexpected discard of a packet when the packet concerned is unexpectedly discarded.

According to one aspect of an embodiment, an information collecting apparatus having a plurality of data communication/network related function processing units is provided. The apparatus collects data communication/network related process information corresponding to a data communication/network related process on a received packet executed by any of the function processing units by judging whether the received packet corresponds to a monitoring target, and adding identifying information uniquely identifying the judged monitoring target packet to the judged monitoring target packet, adding process information indicating a user policy used in data communication/network related processing of the monitoring target packet at each of the function processing units, to the monitoring target packet, and storing each of the process information added to the monitoring target packet, in association with the identifying information added to the monitoring target packet.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a diagram showing an exemplary structure of a packet judging table according to the embodiment;

FIG. 5 is a diagram showing exemplary storage of the device internal information according to the embodiment;

DETAILED DESCRIPTION OF THE PREFERRED EMBODIMENTS

Embodiments of the information collecting program stored on a computer readable recoding medium, the information collecting method, and the information collecting apparatus will be described in detail below with reference to the attached drawings. The integrated network device applying the information collecting program thereto will be exemplified in the description below.

The integrated network device according to an embodiment will be outlined below, followed by the description on the configuration and processing of the integrated network device.

Figure 1:
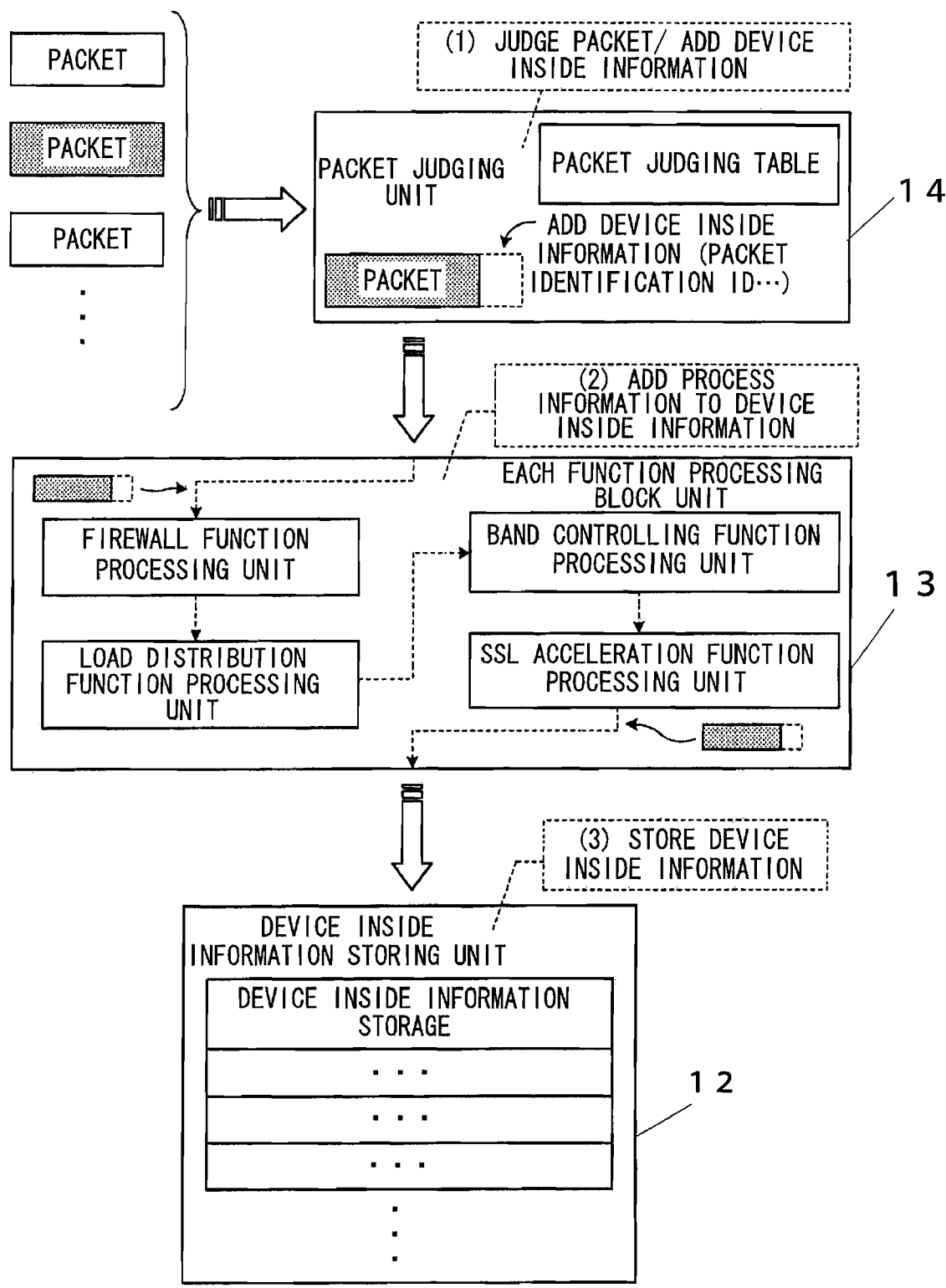
FIG. 1 is a diagram outlining an integrated network device according to an embodiment.

The integrated network device according to the embodiment is outlined with reference to FIG. 1.

The integrated network device shown in FIG. 1 has a plurality of data communication/network related function processing units 13. The integrated network device collects information on data communication/network related process ("process") performed on a received packet by each function processing unit by each of the function processing units through which the received packet is passed, according to a user policy. A user policy defines behavior of each data communication/network related function processing on a received packet for each user who sent the packet. If a packet is unexpectedly discarded in any of the function processing units, the integrated network device can promptly determine the cause of the discard.

As shown in FIG. 1, the integrated network device includes a packet judging unit 14, respective function processing block units 13, and a device internal (inside) information storing unit 12. When the integrated network device with such a configuration receives a packet sent from another network device, the packet judging unit judges whether the received packet is a monitoring target or not. Then, as shown in (1) of FIG. 1, the packet judging unit adds device internal information to the judged received packet and sends out the received packet to each of the function processing block units.

The packet judging unit judges whether the received packet is the monitoring target or not based on a packet judging table. The packet judging table stores target packet information for judging a packet to be monitored, and a packet identification ID that is uniquely set to the target packet information in association with each other. Then, the packet judging unit extracts the packet identification ID corresponding to the received packet that is judged as the monitoring target from the packet judging table, adds the device internal information including the extracted packet identification ID to the received packet and sends them out to each function processing block unit. The device internal information has a data format/structure to include/specify/store information regarding the data communication/network related processing on the received packet for each function processing unit which comprises each function processing block unit.

Next, as shown in (2) of FIG. 1, each function processing block unit of the integrated network device adds process information, which indicates a process or represents a user policy, to the received packet that is sent out from the packet judging unit and sends out the received packet to the device internal information storing unit.

Specifically, each function processing block unit includes a firewall function processing unit, a load distribution function processing unit, a band controlling function processing unit and an SSL acceleration function processing unit. The firewall function processing unit, the load distribution function processing unit, the band controlling function processing unit and the SSL acceleration function processing unit perform various processes on the received packet, for example, in this order respectively, so as to add the process information to the device internal information and send the information to the next component.

Now, the process performed by each function processing unit will be briefed. Assuming that the firewall function processing unit has a plurality of functions from a function A to a function F. The firewall function processing unit processes the received packet according to the user policy that defines behavior of each function for processing the received packet for each user who sent the packet. Further, the firewall function unit embeds the process information, which indicates a process, in a predetermined storing place provided for the device internal information for each function of the firewall function processing unit.

If the firewall function processing unit performs process of "allowing the received packet to be passed with the function A and not to be passed with the other functions B to F", the firewall function processing unit embeds one bit information "1" in the storing place of the device internal information that is provided for the process information to be embedded by the function A. Further, the firewall function processing unit embeds "0" in the storing place of the device internal information that is provided for the process information to be embedded by each of the functions B to F. If the firewall function processing unit performs process of "discarding the received packet", the firewall function processing unit embeds "1" in the storing place of the device internal information that is provided for the discarding information to be embedded. Similarly, the other function processing units including the load distribution function processing unit, the band controlling function processing unit, and/or the SSL acceleration function processing unit perform process respectively.

The SSL acceleration function processing unit performing the last process among the function processing units performs the process on the received packet that is received from the band controlling function processing unit, and then sends out the received packet to the device internal information storing unit.

Next, the device internal information storing unit of the integrated network device receives a packet from each function processing block unit, and stores the device internal information added to the received packet in the device internal information storage. Specifically, when the device internal information storing unit receives the packet, the device internal information storing unit stores the process information that is included in the device internal information, in association with the packet identification ID that is also included in the device internal information added to the received packet. The process information indicating the user policy that is used for the process at each function processing unit is stored for each received packet in that manner. Such process allows an administrator of the device to collect the process information, being ready to recognize which function processing unit passed through the received packet by using which sub function in analyzing the device internal information read out from the device internal information storage.

Accordingly, the integrated network device can promptly determine the cause of unexpected discard of a packet when the packet concerned is unexpectedly discarded in any of the function processing units.

[Configuration of the Integrated Network Device]

Figure 2:
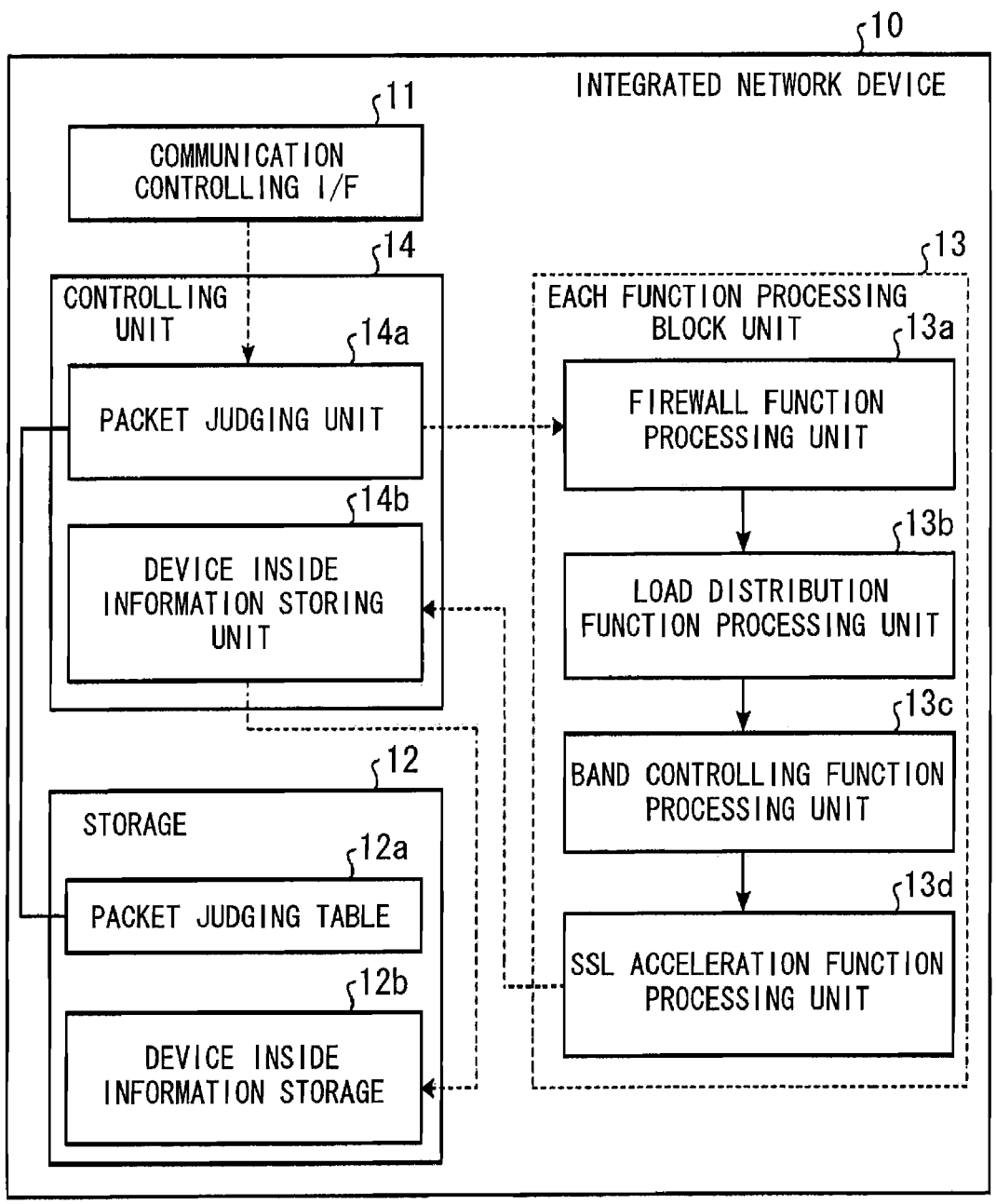
FIG. 2 is a block diagram showing a configuration of the integrated network device according to the embodiment.
Figure 4:
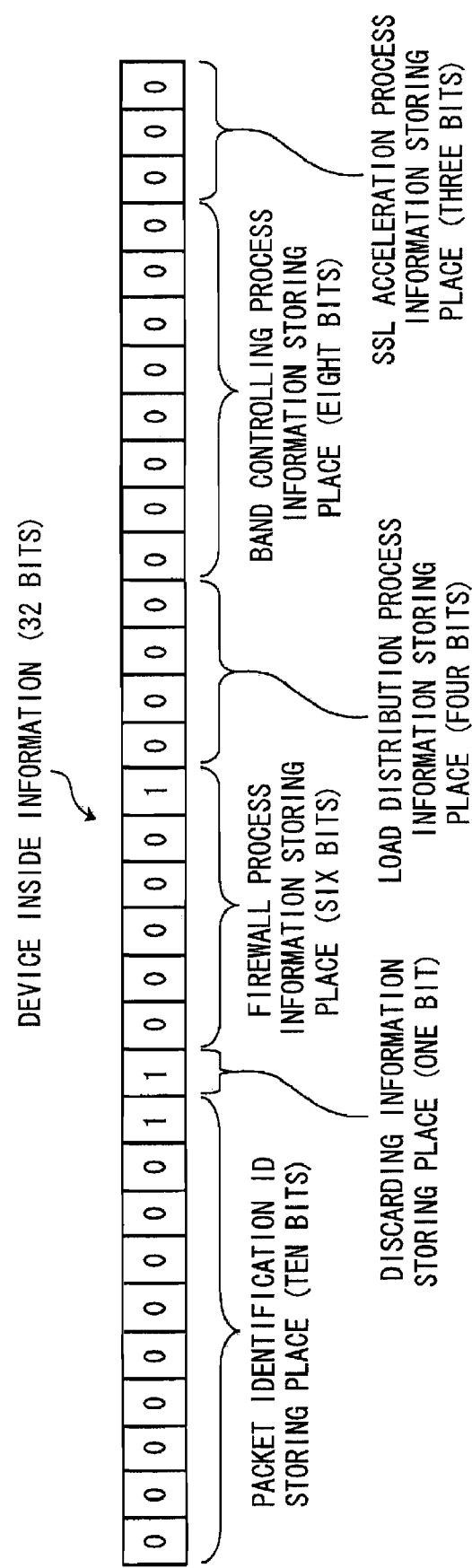
FIG. 4 is a diagram showing an exemplary arrangement of device internal information according to the embodiment.

Now, a configuration of the integrated network device according to the embodiment will be described with reference to FIGS. 2 to 5. FIG. 2 is a block diagram showing a configuration of the integrated network device. FIG. 3 is a diagram showing an exemplary structure of a packet judging table. FIG. 4 is a diagram showing an exemplary arrangement of device internal information. FIG. 5 is a diagram showing exemplary storage of the device internal information.

As shown in FIG. 2, the integrated network device has a communication controlling I/F unit 11, storage 12, respective function processing block units 13, and a controlling unit 14. The communication controlling I/F unit 11 controls the communication of various types of information that is to be exchanged with the other network devices, and sends out the received packet to the packet judging unit 14a.

The storage 12 is a storing unit for storing data and programs required in various types of processing performed by the controlling unit 14. The storage 12 has a packet judging table 12a and a device internal information storage 12b in particular.

The packet judging table 12a is a table used for judgment that is performed by the packet judging unit 14a. Specifically, as exemplified in FIG. 3, the packet judging table 12a is adapted to store the target packet information for judging a packet as the monitoring target, and the packet identification ID that is uniquely set to the target packet information in association with each other. For example, the target packet information includes a destination address, a destination port number, or application user identification number, or any combinations thereof.

The device internal information storage 12*b* is storage for storing the device internal information that is stored by a device internal information storing unit 14*b*. Specifically, as exemplified in FIG. 4, as an example, the device internal information has 32 bit information with process information storing regions allocated thereto. The process information storing regions are allocated to ten bits for a packet identification ID storing place, one bit for a discarding information storing place, six bits for a firewall process information storing place, four bits for a load distribution process information storing place, eight bits for a band controlling process information storing place, and three bits for an SSL acceleration process information storing place, respectively. As for the region allocated to the firewall process information storing place, in each bit of the region comprising six bits is to be embedded the process information by each function processing unit provided for a firewall function processing unit 13*a*. When the process of each function is performed, one bit information "1" is embedded in the region corresponding to the preformed process. When the process is not performed, one bit information "0" is embedded in region corresponding to the process.

Each of the function processing block units 13 is a processing unit for performing various data communication/network related processes on the received packet received from the packet judging unit 14*a*. Each of the function processing block units 13 has the firewall function processing unit 13*a*, a load distribution function processing unit 13*b*, a band controlling function processing unit 13*c*, or an SSL acceleration function processing unit 13*d*, or any combinations thereof. The firewall function processing unit 13*a*, the load distribution function processing unit 13*b*, the band controlling function processing unit 13*c*, and the SSL acceleration function processing unit 13*d* perform processes on the received packet, for example, in this order respectively, so as to add the process information to the device internal information. The SSL acceleration function processing unit 13*d* receiving the packet performs the process on the received packet and then sends out the received packet to the device internal information storing unit.

Process performed by each function processing unit will be briefed. Assuming that the firewall function processing unit 13*a* has a plurality of functions from a function A to a function F (sub-functions). The firewall function processing unit 13*a* processes the received packet according to the user policy that defines behavior of each function for processing the received packet for each user who sent the packet, and embeds the process information indicating the performed process in a predetermined storing place provided for the device internal information for each function of the firewall function processing unit.

If the firewall function processing unit 13*a* performs process of "allowing the received packet to be passed with the function A and not to be passed with the other functions B to F", the firewall function processing unit 13*a* embeds one bit information "1" in the storing place of the device internal information that is provided for the process information to be embedded by the function A. Further, the firewall function unit 13*a* embeds "0" in the storing place of the device internal information that is provided for the process information to be embedded by each of the functions B to F. If the firewall function processing unit performs process of "discarding the received packet", the firewall function processing unit embeds "1" in the storing place of the device internal information that is provided for the discarding information to be embedded. The other function processing units, the load distribution function processing unit 13*b*, the band controlling function processing unit 13*c*, and the SSL acceleration function processing unit 13*d* perform similar process respectively.

The controlling unit 14 is a processing unit with an internal memory for storing a predetermined control program, a program that defines various procedures, and required data so as to perform various types of processing using the program and data. The controlling unit 14 has the packet judging unit 14*a* and the device internal information storing unit 14*b* in particular.

The packet judging unit 14*a* is a unit that performs, for example, judgment for judging whether the received packet received from the communication controlling I/F 11 is a monitoring target or not. Specifically, the packet judging unit 14*a* judges whether the received packet corresponds to a monitoring target or not based on the packet judging table 12*a* stored in the storage 12. Next, the packet judging unit 14*a* extracts the packet identification ID corresponding to the received packet that is judged as a monitoring target from the packet judging table, adds the device internal information with the extracted packet identification ID inserted therein to the received packet, and sends them out to each of the function processing block units 13.

The device internal information storing unit 14*b* is a storing unit for storing the device internal information that is added to the received packet in the device internal information storage 12*b*. Specifically, when the device internal information storing unit 14*b* receives a packet from the function processing block units 13, particularly from the SSL acceleration function processing unit 13*d*, the device internal information storing unit 14*b* stores process information included in the device internal information that is added to the received packet, in association with the packet identification ID that is also included in the device internal information.

As mentioned above, the process information which indicates the user policy that is used as a basis for the process in each of the function processing units is stored for each received packet. That allows an administrator of the device to collect the process information, being ready to recognize which function processing unit has the received packet passed through by using which sub function by analyzing the device internal information read out from the device internal information storage.

[Processing of the Integrated Network Device]

Figure 6:
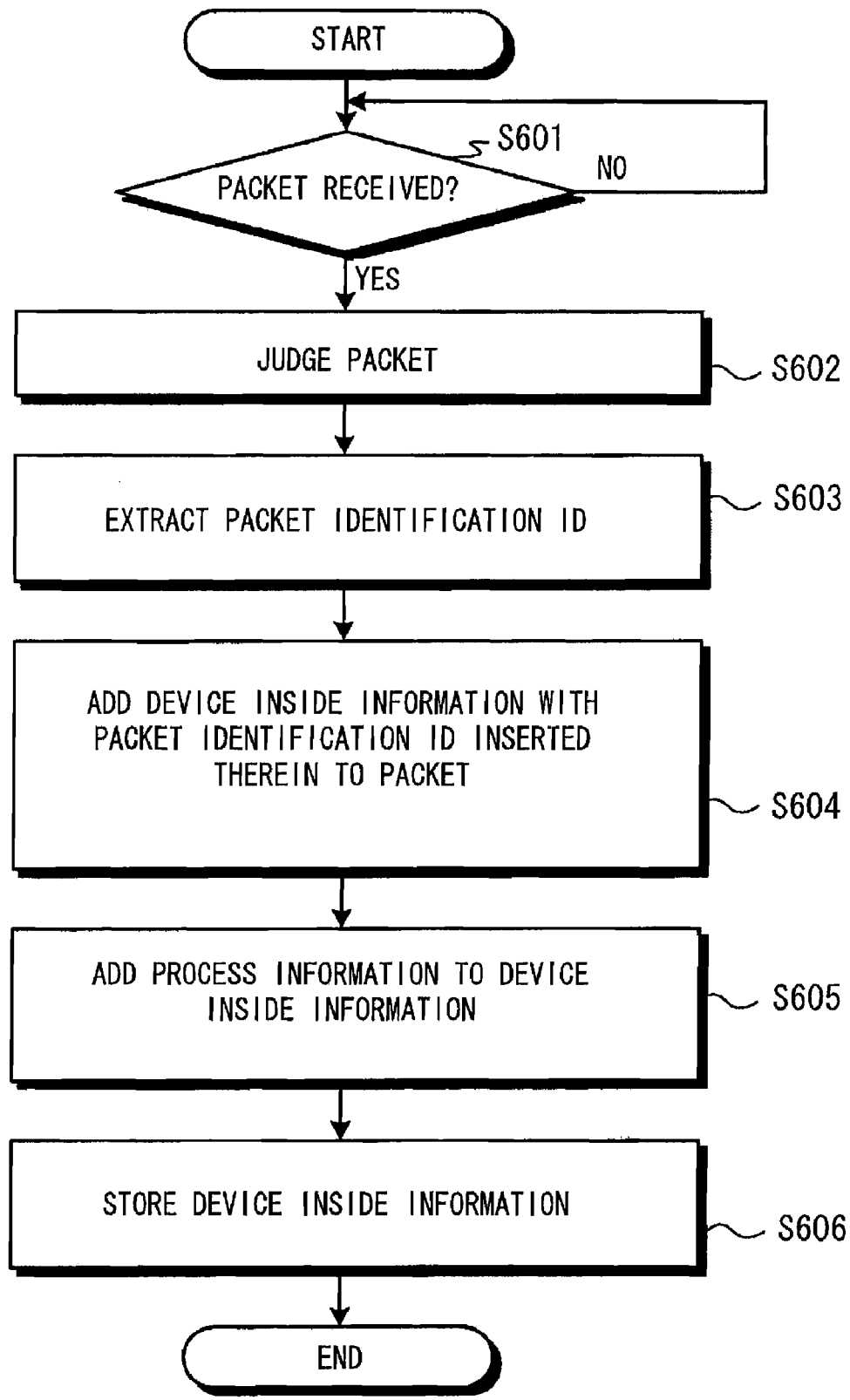
FIG. 6 is a flowchart showing a flow of processing performed in the integrated network device according to the embodiment.

Now, processing of the integrated network device according to the embodiment will be described. FIG. 6 is a flowchart showing a flow of processing performed in the integrated network device according to the embodiment.

As shown in FIG. 6, when the integrated network device receives a packet (YES at S601), the packet judging unit 14*a* judges whether the received packet corresponds to a monitoring target or not based on the packet judging table 12*a* that is stored in the storage 12 (S602). Next, the packet judging unit 14*a* extracts the packet identification ID corresponding to the received packet that is judged as a monitoring target from the packet judging table (S603). Then, the packet judging unit 14*a* adds the device internal information with the extracted packet identification ID inserted therein to the received packet (S604) and sends out the received packet to each of the function processing block units 13.

The function processing block units 13 perform respective processes on the received packet that is received from the packet judging unit 14*a*. Specifically, the firewall function processing unit 13*a*, the load distribution function processing unit 13*b*, the band controlling function processing unit 13*c*, and the SSL acceleration function processing unit 13d which comprise the function processing block units 13 perform processes on the received packet, for example, in this order respectively. Further, each function processing block units add the process information that went through (performed by) the respective function processing units to the device internal information in order (S605). When the SSL acceleration function processing unit 13d that finally receives the received packet performs its corresponding process, and then sends out the received packet to the device internal information storing unit.

When the device internal information storing unit 14b receives the packet from each of the function processing block units 13, such as SSL acceleration function processing unit 13d, the device internal information storing unit 14b stores process information included in the device internal information that is added to the received packet, in association with the packet identification ID that is also included in the device internal information (S606).

As mentioned above, the system according to the embodiment judges whether the received packet corresponds to the monitoring target or not based on the information that is set in advance to determine the received packet that is the monitoring target, and adds the packet identification ID that uniquely identifies the judged packet. Then, the system according to the embodiment further adds process information that indicates the user policy that is used as a basis for processing the received packet at respective function processing units to the received packet that already has the packet identification ID given thereto, and stores the process information in association with the packet identification ID. If a packet is unexpectedly discarded, the system of the embodiment can promptly determine the cause of the discard as it is ready to recognize which function processing unit has the received packet passed through by using which sub function so that it can collect the process information.

The system of the embodiment extracts the packet to be extracted based on the destination address and the destination port number of the received packet, and the application identification number corresponding to the received packet. That enables the received packet that is an extracting target to be extracted only with the minimum information set.

In the above description of the embodiment, when the device internal information storing unit 14b receives the packet from each of the function processing block units 13, the device internal information storing unit 14b stores the device internal information that is added to the received packet in the device internal information storage 12b. The present invention, however, is not limited to the above-mentioned description, and may be adapted to store the device internal information after judging whether the device internal information is a storing target or not. Now, another example of the configuration and the processing of the integrated network device will be described below.

[Configuration of the Integrated Network Device]

First, the configuration of another embodiment of the integrated network device will be described below with reference to FIG. 7.

Figure 7:
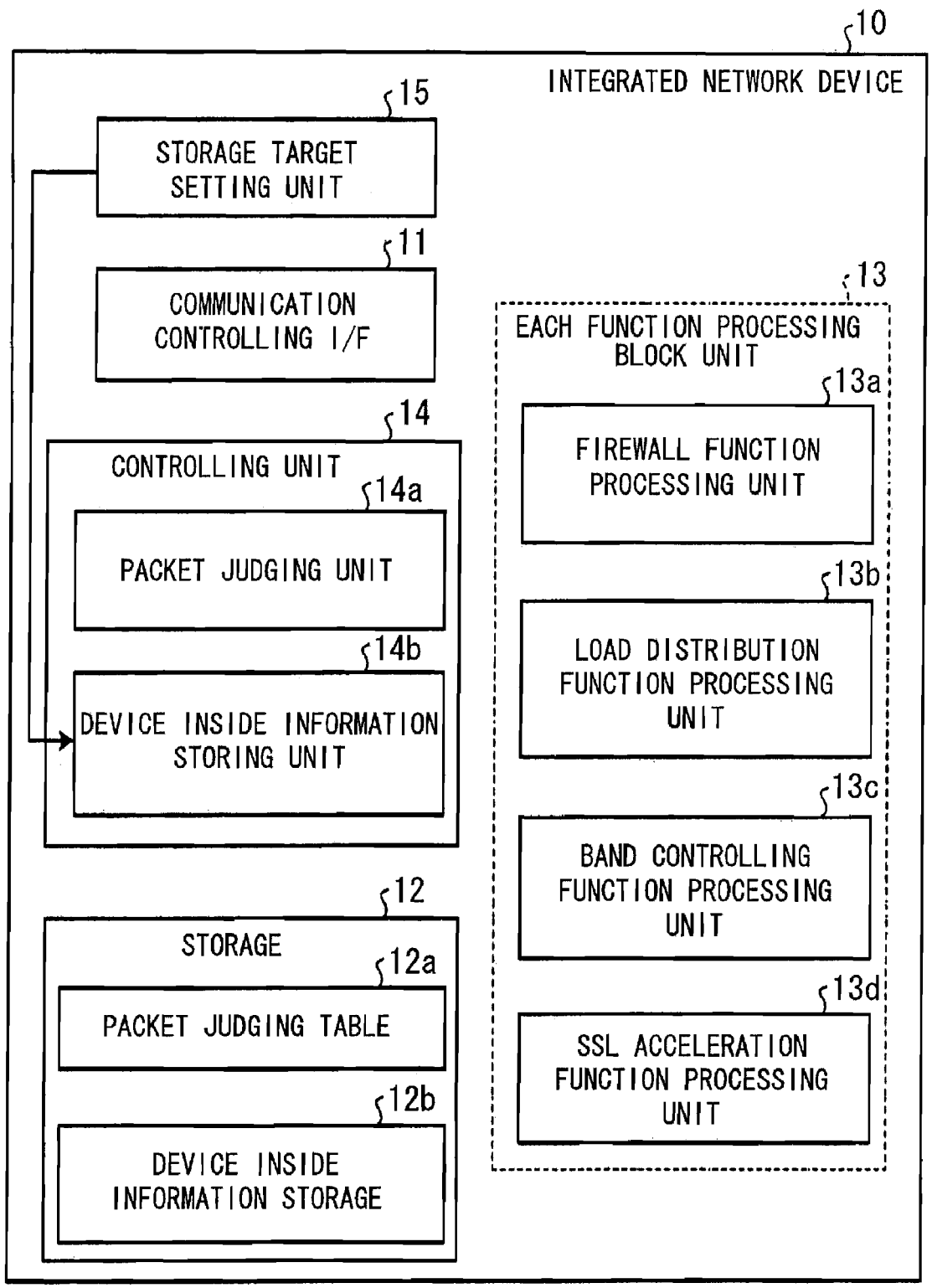
FIG. 7 is a block diagram showing a configuration of the integrated network device according to another embodiment.

Specifically, in the integrated network device shown in FIG. 7, a storing target setting unit 15 receives an input from an administrator of the device, and sets the information for judging whether the device internal information is the storing target or not in the device internal information storing unit 14b. For example, the storing target setting unit 15 sets such that the device internal information including a predetermined identification ID is judged as the storing target.

Then, the device internal information storing unit 14b judges whether the device internal information added to the received packet is the storing target or not based on the setting performed at the storing target setting unit 15. If the device internal information is judged as the storing target, the device internal information storing unit 14b stores the device internal information into the device internal information storage 12b.

For example, when the device internal information storing unit 14b receives the packet from each of the function processing block units 13, such as SSL acceleration function processing unit 13d, the device internal information storing unit 14b examines whether the device internal information added to the received packet includes a predetermined packet identification ID or not. If it is found that the device internal information includes the predetermined packet identification ID, the device internal information storing unit 14b stores the device internal information into the device internal information storage 12b.

The device internal information storing unit 14b may be adapted to judge the device internal information, in which the information indicating that discarding has been performed, one bit information "1", for example, is embedded as discarding information, as the storing target. For example, the device internal information storing unit 14b examines whether one bit information "1" indicating that the discarding has been performed is embedded in the process information included in the device internal information that is added to the received packet as discarding information or not. If it is found that the information indicating that discarding has been performed is embedded in the process information, the device internal information storing unit 14b stores the device internal information into the device internal information storage 12b.

[Processing of the Integrated Network Device]

Now, the processing performed at the integrated network device shown in FIG. 7 will be described. The processing from S801 to S805 shown in FIG. 8 performed at the integrated network device according to FIG. 7 is same as the processing from S601 to S605 shown in FIG. 6.

The device internal information storing unit 14b judges whether the device internal information added to the received packet is the storing target or not based on the setting by the storing target setting unit 15 (S806). If the device internal information is judged as the storing target (YES at S806), the device internal information storing unit 14b stores the device internal information into the device internal information storage 12b (S807). If the device internal information is not judged as the storing target (NO at S806), the device internal information storing unit 14b does not store the device internal information into the device internal information storage 12b.

Specifically, when the device internal information storing unit 14b receives the packet from each of the function processing block units 13 such as SSL acceleration function processing unit 13d, the device internal information storing unit 14b examines whether the device internal information that is added to the received packet includes a predetermined packet identification ID or not (S806). If it is found that the predetermined packet identification ID is included (YES at S806), the device internal information storing unit 14b stores that examined device internal information into the device internal information storage 12b (S807).

The device internal information storing unit 14b can also examine, for example, whether the information indicating that discarding has been performed, for example one bit information "1", is embedded in the process information that is included in the device internal information as discarding information or not (S806). If it is found that the information indicating that discarding has been performed is embedded there (YES at S806), the device internal information storing unit 14b stores that examined device internal information into the device internal information storage 12b (S807).

As mentioned above, the system of the embodiment judges whether the packet is the received packet with the added packet identification ID that is previously specified by a user, and if it is judged as the received packet with the packet identification ID added, the system of the embodiment stores the process information that is given to the received packet in association with the packet identification ID. That enables the system to efficiently store only desired process information and promptly determine the cause of discard in such a case where a received packet corresponding to the packet identification ID that is set as a storing target has been discarded.

For example, the system of the embodiment judges whether the packet is the received packet with the process information added that indicates that it has been discarded at the function processing unit, and if it is judged that it is the received packet with the process information added, the system of the embodiment stores the process information that is given to the received packet in association with the packet identification ID. That enables the system to intensively manage the process information regarding the discarded received packet and promptly determine the cause of discard of the received packet that has been unexpectedly discarded.

Embodiments of the integrated network device has been described, though, the present invention can be implemented in various aspects other than the abovementioned embodiments.

(1) Apparatus Configuration, etc.

Each component of the integrated network device is just shown as a functional concept in FIG. 2 and the present invention is not limited to have the physical configuration as shown. Specifically, the integrated network device is not limited to be integrated and disintegrated as shown in the figure, and can be adapted to be functionally or physically integrated and disintegrated by any unit, for example, by the entire or a part of the integrated network device, according to various loads and its usage. For example, the integrated network device may have the packet judging unit 14a and the device internal information storing unit 14b integrated.

Each function processing that is performed in the integrated network device, for example, the entire or a part of the packet judging function processing or the device internal information storing function processing may be implemented by a CPU or a program that is analyzed in the CPU or may be implemented as hardware by a wired logic.

(2) Information Collecting Program

Figure 8:
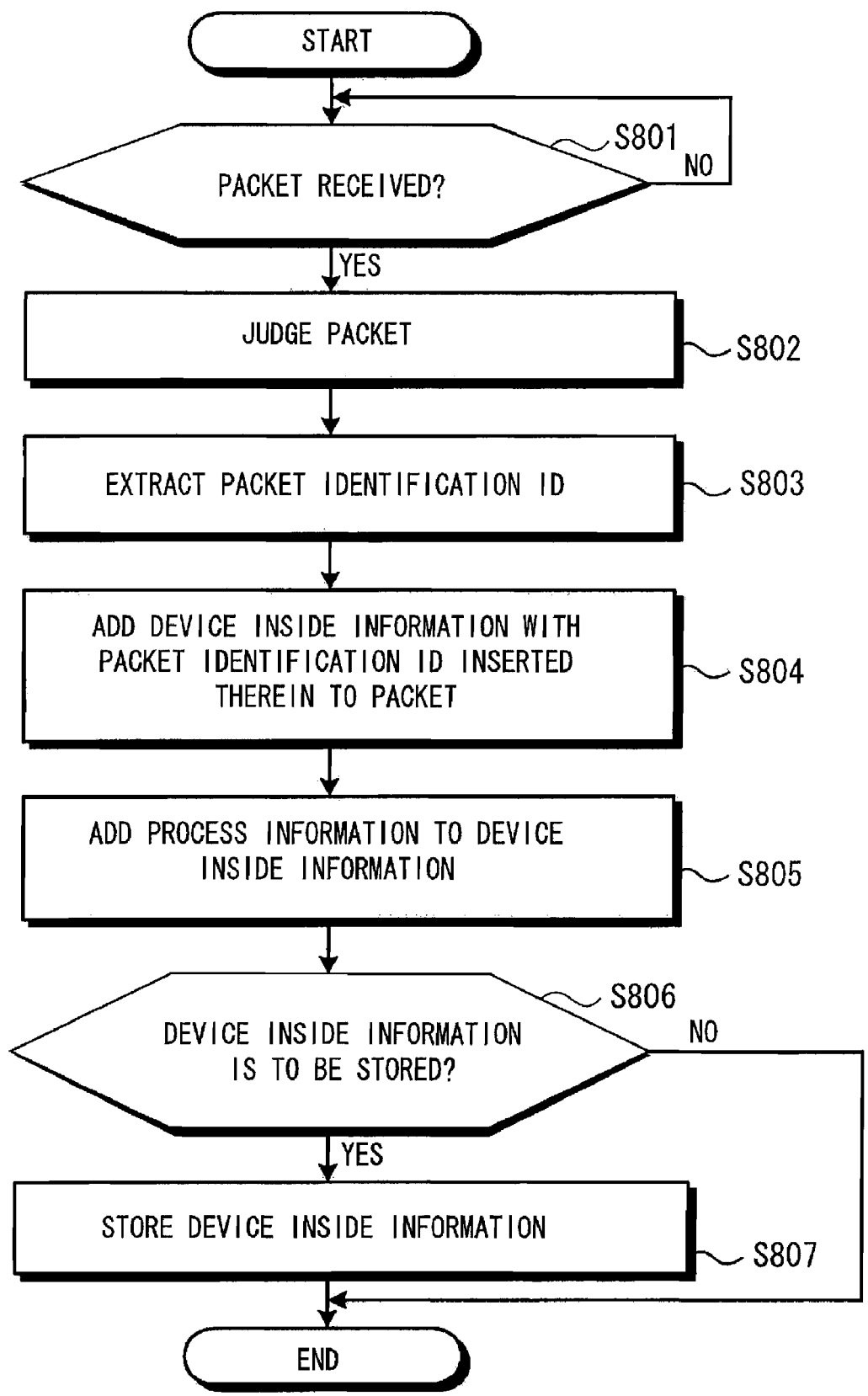
FIG. 8 is a flowchart showing a flow of processing performed in the integrated network device according to another embodiment.
Figure 9:
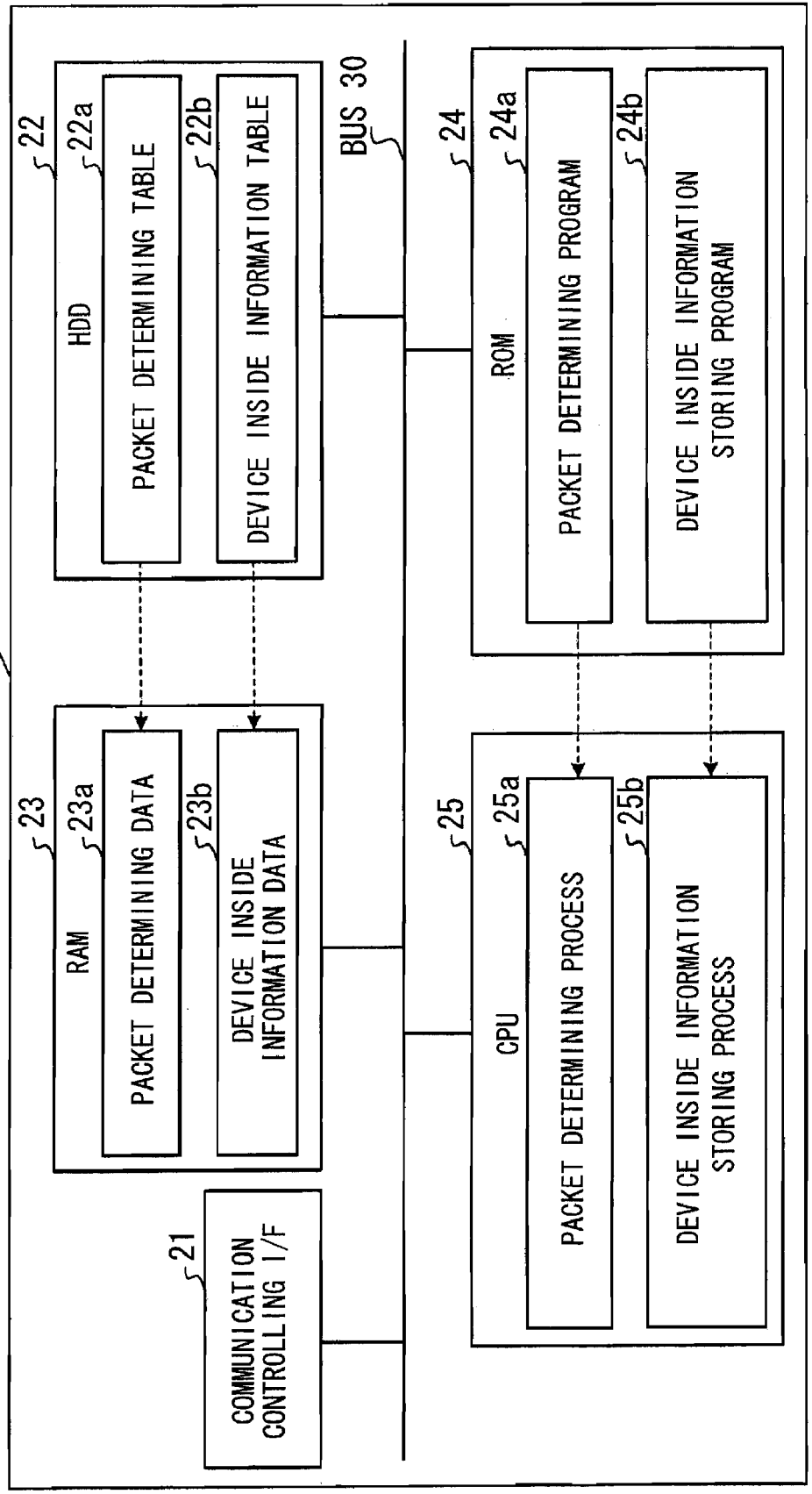
FIG. 9 is a diagram showing a computer that executes an information processing program.

Various processing described with reference to FIGS. 6 and 8 can be implemented as a prepared program is executed in a computer system such as a personal computer or a workstation. An example of the computer to execute such an information collecting program will be described with reference to FIG. 9 below. FIG. 9 is a diagram showing a computer to execute an information collecting program.

As shown in FIG. 9, a computer 20 is adapted as an integrated network device, including a communication controlling I/F 21, an HDD 22, a RAM 23, a ROM 24, and a CPU 25 which are connected with each other via a bus 30.

The ROM 24 stores in advance the information collecting program for implementing the abovementioned function of the integrated network device, i.e., a packet judging program 24a and a device internal information storing program 24b as shown in FIG. 9. The program 24a and the program 24b may be integrated or disintegrated as required as each component of the integrated network device shown in FIG. 2 does. The ROM 24 may be a nonvolatile "RAM".

As the CPU 25 reads out and executes the programs 24a and 24b from the ROM 24, the programs 24a and 24b function as a packet judging process 25a and a device internal information storing process 25b, respectively, as shown in FIG. 9. The processes 25a and 25b correspond to the packet judging unit 14a and the device internal information storing unit 14b of the integrated network device shown in FIG. 2, respectively.

The HDD 22 is provided with a packet judging table 22a and a device internal information table 22b as shown in FIG. 9. The packet judging table 22a and the device internal information table 22b correspond to the packet judging table 12a and the device internal information storage 12b shown in FIG. 2, respectively. The CPU 25 reads out packet judging data 23a and device internal information data 23b from the packet judging table 22a and the device internal information table 22b respectively, and store them in the RAM 23, and executes the processing based on the packet judging data 23a and the device internal information data 23b which are stored in the RAM 23.

The programs 24a and 24b need not be initially stored in the ROM 24. They may be stored in "portable physical media" including a flexible disk (FD), a CD-ROM, a DVD disk, a magneto-optical disk, and an IC card which are to be inserted in the computer 20, or "fixed physical media" including an HDD that may be provided for both inside and outside of the computer 20, and "another computer (or server)" that is connected with the computer 20 via a public network, the Internet, LAN or WAN from which the computer 20 can read out and execute the programs.

Although the information collecting program, the information collecting method, and the information collecting apparatus according to the embodiment are not limited to the claims below, they are useful in a network device configured by a plurality of function processing units in such a case where they cause a computer to execute the processing of collecting the process information on what a function processing unit has executed on the received packet for each of the function processing units through which the received packet has passed according to the user policy. Particularly, they are suitably used to promptly determine the cause of discard of a packet that is unexpectedly discarded.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of transmission communication media includes a carrier-wave signal.

Further, according to an aspect of the embodiments of the invention, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer readable recording medium that stores an information collecting program, the information collecting program causes the computer to execute operations comprising:

judging whether a received packet corresponds to a monitoring target packet;

adding identifying information uniquely identifying the judged monitoring target packet to the judged monitoring target packet;

adding process information indicating a user policy used in data communication and/or network related processing of the monitoring target packet to the monitoring target packet; and storing the process information added to said monitoring target packet, in association with the identifying information added to the monitoring target packet by judging whether the process information added to the monitoring target packet is a storing target and storing the process information in association with the identifying information added to the monitoring target packet, when judged that the process information is the storing target, wherein the storing further includes:
determining whether the process information added to the monitoring target packet indicates the monitoring target packet is discarded, and
judging the process information is the storing target and storing the process information in association with the identifying information added to the monitoring target packet, if determined that the monitoring target packet is discarded.

2. The computer readable recording medium according to claim 1, wherein said information collecting program further causes the computer to execute operations comprising:

setting the identifying information as judging information for judging whether the process information added to the monitoring target packet is the storing target;

judging the process information is the storing target if the set identifying information and the identifying information added to said monitoring target packet match each other; and storing the process information in association with the identifying information added to the monitoring target packet.

3. The computer readable recording medium according to claim 1, wherein said information collecting program further causes the computer to execute operations comprising:

extracting the identifying information based on a destination address of the received packet, a destination port number of the received packet, or an application identifying number corresponding to the received packet, or any combinations thereof, when said identifying information is to be added.

4. An information collecting method for information collecting process on a received packet executed by a plurality of data communication and/or network related function processing units through which the received packet has passed, the information collecting method comprising:

judging whether the received packet corresponds to a monitoring target packet based on information set in advance to determine the received packet as the monitoring target packet;

adding identifying information uniquely identifying the judged monitoring target packet to the judged monitoring target packet;

adding process information indicating a user policy used in data communication and/or network related processing of the monitoring target packet at each of the function processing units to the monitoring target packet; and storing the process information added to the monitoring target packet in association with said identifying information added to the monitoring target packet by judging whether said process information added to said monitoring target packet is a storing target and if judged that said process information is the storing target, storing the process information in association with said identifying information added to said monitoring target packet, wherein the storing further includes:
determining whether the process information added to the monitoring target packet indicates the monitoring target packet is discarded at any of the function processing units, and
judging said process information is the storing target and storing the process information in association with the identifying information added to the monitoring target packet, if determined that the monitoring target packet is discarded.

5. The information collecting method according to claim 4, wherein said information collecting method further comprises:

setting said identifying information as judging information for judging whether said process information added to said monitoring target packet is the storing target; and if the set identifying information and the identifying information added to said monitoring target packet match each other, judging said process information is the storing target and storing the process information in association with the identifying information added to the monitoring target packet.

6. The information collecting method according to claim 4, wherein said information collecting method further comprises:

extracting the identifying information based on a destination address, a destination port number of said received packet, or an application identifying number corresponding to the received packet, or any combinations thereof.

7. An information collecting apparatus having a plurality of data communication and/or network related function processing units, the information collecting apparatus comprising:

identifying information adding unit that judges whether a received packet corresponds to a monitoring target packet, and adds identifying information uniquely identifying the judged monitoring target packet to the judged monitoring target packet;

process information giving unit that adds process information indicating a user policy used in data communication and/or network related processing of the monitoring target packet at each of the function processing units, to the monitoring target packet; and process information storing unit that stores the process information added to the monitoring target packet, in association with the identifying information added to the monitoring target packet by judging whether the process information added to the monitoring target packet is a storing target and storing the process information in association with the identifying information added to said monitoring target packet, when judged that the process information is the storing target, wherein said process information storing unit determines whether the process information added to the monitoring target packet indicates the monitoring target packet is discarded at any of the function processing units and stores the process information in association with the identifying information added to the monitoring target packet, if determined that the monitoring target packet is discarded.

8. The information collecting apparatus according to claim 7, further comprising:

judging information setting unit that sets the identifying information for judging whether the process information added to the monitoring target packet is the storing target; and the process information storing unit stores the process information in association with the identifying information added to the monitoring target packet, if the set identifying information and the identifying information added to the monitoring target packet match each other.

9. The information collecting apparatus according to claim 7, wherein said identifying information adding unit extracts the identifying information based on a destination address, a destination port number of the received packet, or an application identifying number corresponding to the received packet, or any combinations thereof.

* * * * *